United States Patent [19]
Diener

[11] Patent Number: 5,475,485
[45] Date of Patent: Dec. 12, 1995

[54] INSTRUMENT FOR WORKING THE SURFACES OF PARTS INSIDE ENGINEERED CAVITIES

[75] Inventor: Jörg Diener, Oberderdingen, Germany

[73] Assignee: Richard Wolf GmbH, Knittlingen, Germany

[21] Appl. No.: 164,917

[22] Filed: Dec. 10, 1993

[30] Foreign Application Priority Data

Dec. 11, 1992 [DE] Germany .......................... 42 41 767.8

[51] Int. Cl.⁶ .................................................. G01N 21/00
[52] U.S. Cl. ............................................................ 356/241
[58] Field of Search .................................... 356/241, 376, 356/378; 128/6; 15/339, 414, 104.03

[56] References Cited

U.S. PATENT DOCUMENTS

| | | |
|---|---|---|
| 3,802,420 | 4/1974 | Moffat et al. |
| 4,273,111 | 6/1981 | Tsukaya ................... 356/241 |
| 4,286,585 | 9/1981 | Ogawa .................... 356/241 |
| 4,721,012 | 1/1988 | Donazar ................... 74/665 |
| 4,793,326 | 12/1988 | Shishido .................. 356/241 |
| 4,820,043 | 4/1989 | Diener .................... 356/241 |
| 4,842,578 | 6/1989 | Johnson et al. |
| 5,046,845 | 9/1991 | Diener .................... 356/241 |
| 5,102,221 | 4/1992 | Desgranges et al. ........... 356/241 |
| 5,195,392 | 3/1993 | Moore et al. ............... 356/241 |
| 5,311,639 | 5/1994 | Boshier ................... 356/241 |
| 5,349,940 | 9/1994 | Takahashi et al. ............ 356/241 |

FOREIGN PATENT DOCUMENTS

| | | |
|---|---|---|
| 2206935 | 10/1972 | Germany. |
| 3710140 | 10/1988 | Germany. |
| 1-112141 | 4/1989 | Japan ..................... 356/241 |
| 2134129 | 5/1990 | Japan. |

OTHER PUBLICATIONS

Machida, Inc. Brochure "Power Blending Borescope Kit MA-KPDA2 System", 2 pages.
Abstract of U.S. Patent 4,721,012 (Jan. 1988).
Abstract of U.S. Patent 4,143,489 (Mar. 1979).

Primary Examiner—Richard A. Rosenberger
Assistant Examiner—Jason D. Eisenberg
Attorney, Agent, or Firm—Panitch Schwarze Jacobs & Nadel

[57] ABSTRACT

An instrument is provided for working of surfaces of parts inside engineered cavities by means of a tool, with the possibility of simultaneous viewing of the site of the working operation. The instrument, also called a borescope, has a tool that can be placed at the end of the instrument shaft and be driven in a rotating fashion by means of a belt that goes around a drive pulley at one end and, at the other end, around a pulley secured to a shaft that is mounted in a head that carries the tool and can swivel. In its operating position, the head is turned at an angle of 90° to the shaft, whereby the pulleys lie in the same plane. At other angles, the belt is prevented from jumping out of the pulley.

10 Claims, 5 Drawing Sheets

INSTRUMENT FOR WORKING THE SURFACES OF PARTS INSIDE ENGINEERED CAVITIES

FIELD OF THE INVENTION

The invention relates to an instrument for the working of surfaces of parts inside engineered cavities by means of a tool, with the possibility of simultaneous viewing of the site of the working operation by means of an optic comprising a rigid shaft that accommodates the optic, to which shaft is coupled distally a head that carries the tool and is able to swivel relative to the longitudinal axis of the instrument, whereby the tool can be driven by a drive via power transmission means that run through the shaft.

BACKGROUND OF THE INVENTION

With the aid of such instruments, it is possible to carry out repairs on, for example, the power plant blades of turbine power units, without having to undertake time-consuming and therefore expensive dismantling and reassembly. Inspection holes are provided in the turbine housing for this purpose, and instruments of this type can be introduced through these holes so that, for example, small impacts on the leading or trailing edges of the blades can be worked.

An instrument of the type mentioned above is known, for example, from EP 0 426 527 A1 (U.S. Pat. No. 5,102,221). The fundamental unit of this instrument is a technoscope that is provided with a tool carrier that runs through the shaft and that has a swing-out head as tool holder. From the handle of the instrument, this tool holder can be swung out by means of an activating rod running through the carrier, and can accommodate a working tool at its end. The tool carrier is movable in longitudinal oscillations by means of a motorized drive, so that working can be undertaken by means of the back-and-forth oscillating movement of the working tool. The disadvantage with this instrument is that only a small working intensity is attainable with it, which makes the working relatively time-consuming.

Another known instrument has a technoscope, equipped with connections for a camera and illumination, that has a rigid shaft and a flexible tip whose bending can be controlled. This technoscope is modified in such a way that an axially extending, rotating tool accommodation is carried in the tip; this tool accommodation is drivable via a flexible rod running through the shaft and by means of a motor placed in the handgrip of the technoscope. What is disadvantageous about this instrument is that it cannot be angled tightly enough, and the lack of rigidity inherent in the system does not allow precise guidance during the working operations.

It is an object of this invention to create a robust instrument with a head that can be angled and can accommodate a tool, which can be guided precisely even at comparatively high levels of working intensity.

SUMMARY OF THE INVENTION

Starting with an instrument of the above type, this object is achieved in accordance with the invention by a tool which is rotatably driven in a manner known per se, wherein the power transmission means comprises a belt which runs around a first pulley which is located on the drive shaft and around a second pulley which is located at the head and which can be swivelled with the head. The second pulley and the tool lie on the same rotation axis, so that when the head is in a position rotated at an angle of 90° to the longitudinal axis of the instrument, both pulleys lie in the same plane. Means are provided to prevent jumping of the belt from the second pulley when the head is in other positions.

Advantageously the head carrying the tool can be linked with the shaft by means of a swivel bearing and can be swivelled between a rest position, aligned with the shaft, and an operating position angled 90° to that, whereby the angling of the head occurs by means of rod-shaped actuation means that runs through the shaft and attaches to the head eccentrically to the swivel bearing. At the same time, the actuation means can be attached at its proximal end to a slider which is guided in a housing, and can be adjusted by means of an adjusting spindle between limit stops, the rear one of which determines the operating position of the head and the front one of which determines the resting position of the head. The drive for the tool can be implemented by means of a round belt from an electric motor that, in order to tension the belt, is adjustably guided and non-adherently fixed in the housing along the axial direction of the shaft. In place of a round belt, other equivalent means of power transmission can be used, for example, toothed belts, V belts, chains, and the like, that are connected with the associated drive and power take-off means in a non-adherent or possibly also in an adherent fashion.

The instrument equipped with these features offers decided advantages. A very solid instrument is obtained that functions reliably and is able to apply and transmit relatively large working forces through relatively small diameters, so that it is possible with such an instrument to precisely grind, mill, bore, and polish, depending on the tool that is used. At the same time, the working site can be continuously observed by means of an optic which can be guided through a separate channel in the shaft, and which can be a technoscope in a rigid version or with a flexible and controlled-bending tip, and which is also provided with illumination means.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
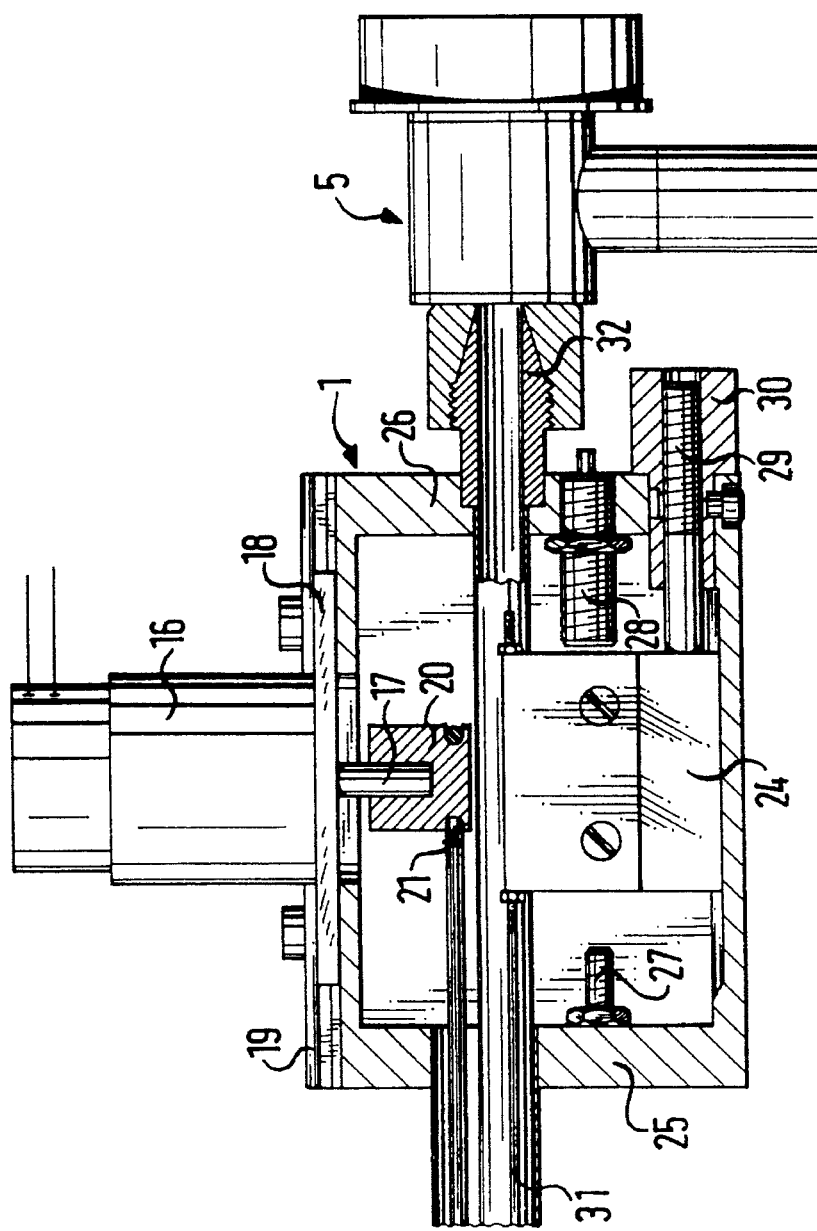
FIG. 1 is a full side view of the instrument according to the invention, equipped with a rigid technoscope and with a tool in the operating position, with the entire drawing shown in partial cutaway.

The instrument of the invention according to FIG. 1 comprises a housing 1, a tubular shaft 2 that is arranged on the distal end of the housing and on whose own distal end is attached a head 3 which can be fitted with a tool 4, and a technoscope 5 that can be inserted proximally into the housing 1 and the shaft 2.

Figure 3:
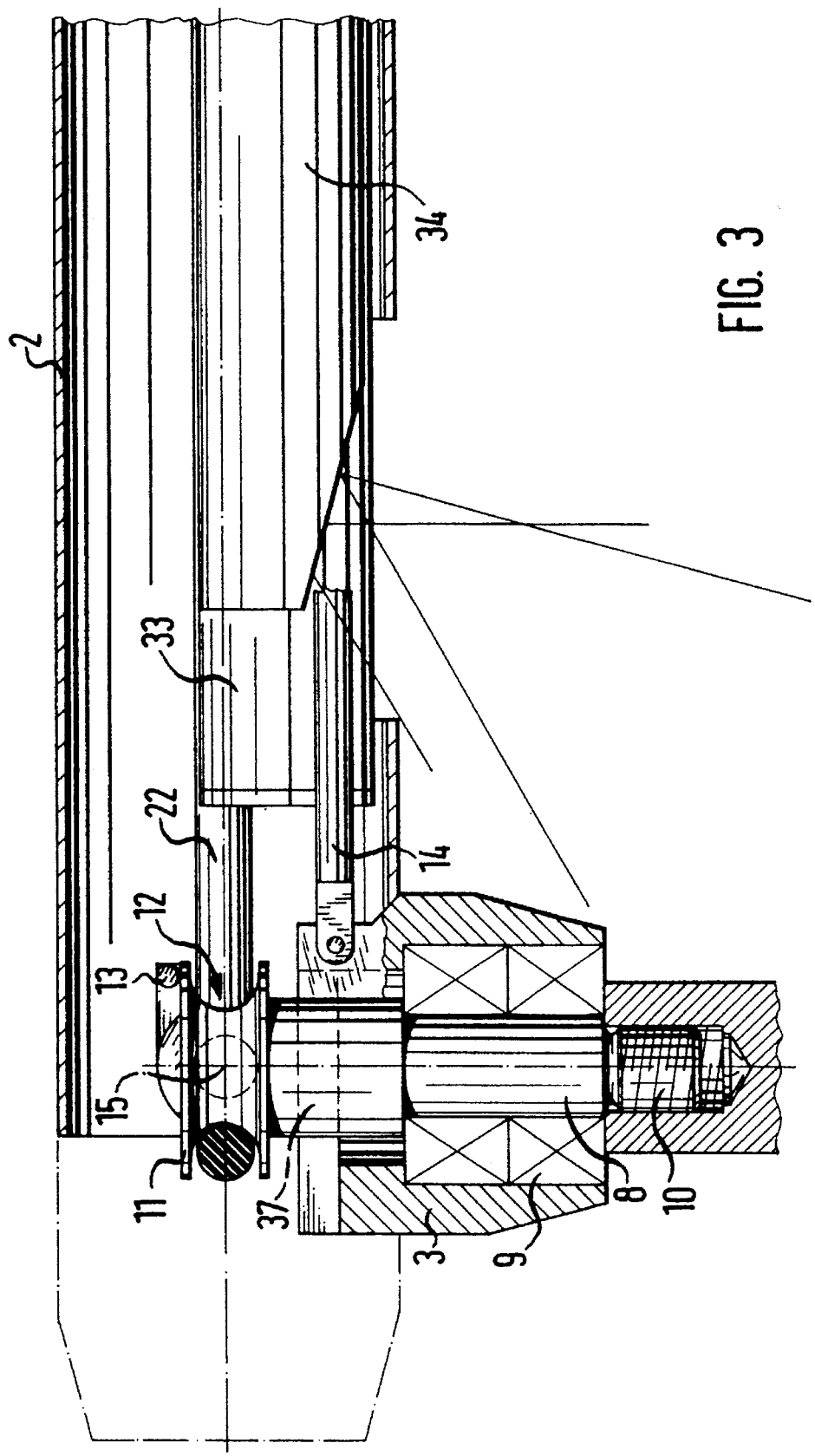
FIG. 3 is a longitudinal section through the end area of the instrument shown in FIG. 1 in larger scale.
Figure 4:
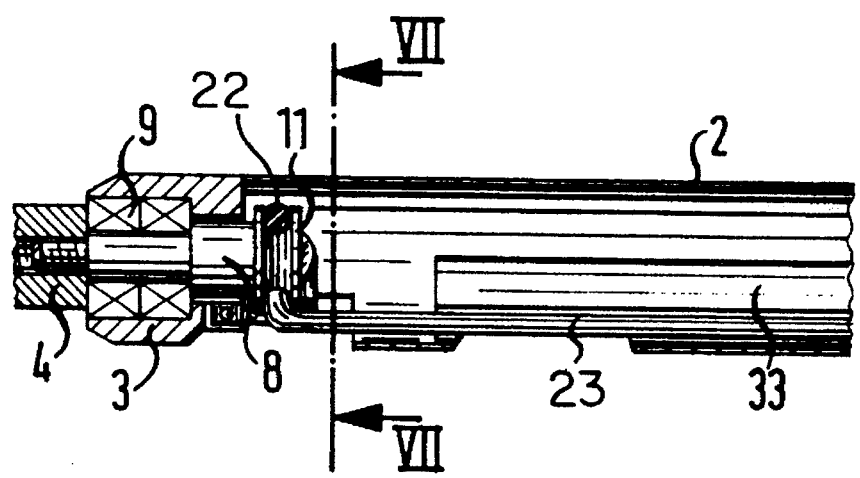
FIG. 4 is a view of the instrument corresponding to FIG. 3, with the head in the insertion position.
Figure 5:
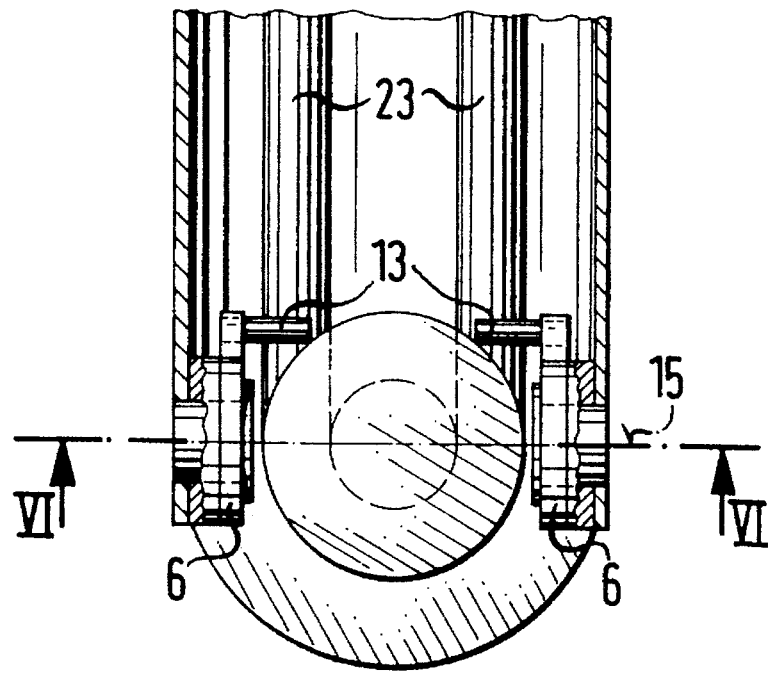
FIG. 5 is a top view of the end area of the instrument according to FIG. 3, shown in longitudinal section.
Figure 6:
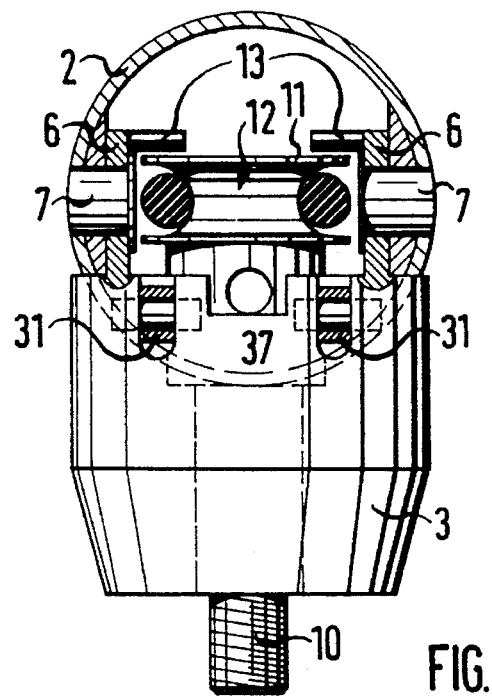
FIG. 6 is a front view of FIG. 5, showing a partial section along the section line VI—VI (FIG. 5)

As can be clearly seen in FIGS. 3, 4, and 6, the head 3 is basically cylindrical in shape, and is formed at its proximal end as a fork with two fork legs 6. Each fork leg 6 has a bore whose axes align with each other and each of which can accommodate a bearing pin 7 that projects outwardly from its fork leg 6. In the head 3, there is a shaft 8 supported in a ball-bearing 9, the axis of the shaft coinciding with the longitudinal axis of the head 3. The shaft 8 projects distally from the head 3, and is there provided with a threaded stem 10 to accommodate a tool 4.

At its proximal end the shaft 8 carries a pulley 11 with a tracking groove 12. The pulley 11 is also placed between the fork legs 6 in such a way that the tracking groove 12 is located in the axial plane of the bearing pins 7. At the outer ends of the fork legs 6, there is also a hold-down clamp 13 secured to each. Both are formed in the shape of a rod and are secured facing each other, whereby they extend essentially parallel to the axis of the bearing pins 7 and in a plane immediately adjacent to the pulley 11. Finally, to the head 3 actuation means 14 are coupled eccentrically to the bearing pins 7, which will be described later in more detail.

Figure 2:
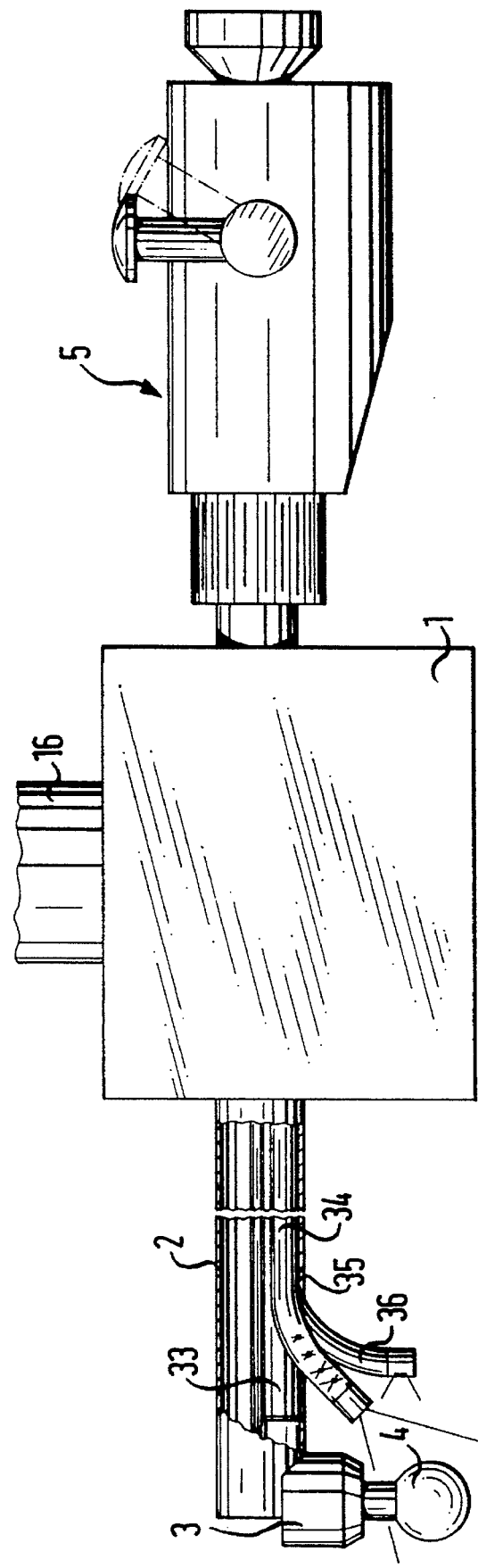
FIG. 2 is a side view of the instrument shown in FIG. 1, but with a flexible technoscope having a controlled-bending tip shown in partial cutaway.
Figure 7:
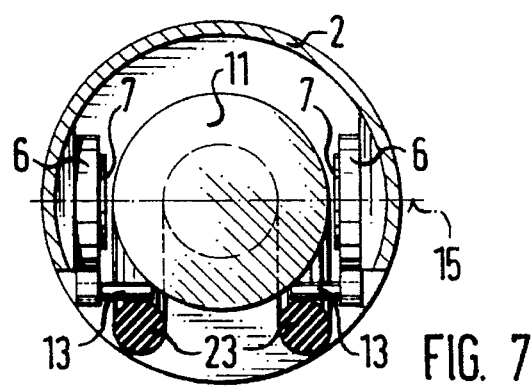
FIG. 7 is a cross-section through the instrument according to FIG. 4, along the section line VII—VII.

The bearing pins 7 grip into bores provided on the inside of the distal end area of the shaft 2, so that the pins extend transversely to and in the plane of the longitudinal axis of the shaft. The bearing pins 7 thus form with their axis a swivel bearing 15 around which the head 3 can swivel, and specifically between a position in which the head 3 aligns with the shaft 2 (FIGS. 4 and 7) and a position rotated at an angle of 90° to the shaft (FIGS. 1 through 3). The housing 1 is, as can be seen in FIGS. 1 and 2, formed as a handle to the side of which is attached an electric motor 16 whose shaft 17 projects into the housing. The motor 16 is provided with a bearing plate 18 that is guided between a pair of connecting blocks 19 in the longitudinal direction of the housing 1, so that the motor 16 can be adjusted in this direction and can be fixed into position. The shaft 17 is fitted with a pulley 20 whose tracking groove 21 lies in a plane that extends through the cavity of the shaft 2. Around this pulley 20 there is guided an endless, round belt 22, which runs through the shaft 2 with both of its tensioning cords 23 and goes around the pulley 11 at the other end, and which can be tensioned by means of an appropriate displacement of the motor 16.

In the housing 1 there is also guided a longitudinally movable slider 24. The path of movement is limited by two adjustable limit stops 27 and 28 in the two facing end walls 25 and 26 of the housing 1. To the slider 24 is secured an adjusting spindle 29 that extends from the rear end wall 26 and that can be moved back and forth by turning an axially fastened knurled nut 30. The previously-mentioned means of actuation 14 is attached at is proximal end to slider 24 and comprises a pair of actuating rods 31. The limit stop 28 is formed by an inductive proximity switch which, upon activation through contact of the slider 24 with it, allows activation of the motor 16.

The technoscope 5 can be inserted into the housing 1 by means of a receptacle 32 in the rear end wall 26 of the housing 1 and can be fixed in an inserted position. A tubular channel 33 in the housing 1 terminates at the receptacle 32 and extends inside the shaft 2 until it reaches the area of the distal shaft end, and serves as a guide for the technoscope shaft 34. In the end area of the channel 33 there is provided a side window 35 which extends through the shaft 2. In the event that a rigid technoscope 5 is used, this window 35 serves to provide a clear field of view for a side optic and/or illumination, while in the event that a flexible technoscope is used that has a controlled-bending tip 36, the window serves as an outlet for the tip 36 (FIG. 2).

To use the instrument according to the invention, the head 3 is first brought into its resting position aligned with shaft 2. This is accomplished by means of appropriate turning of the knurled nut 30 at the rear end wall 26 of the housing 1, which results in the slider 24 being moved against the front limit stop 27. As this is done, the movement is transmitted to the head 3 by means of the actuating rods 31 in such a way that, because of the eccentric attachment of the rods 31, a swivelling moment is produced on the head 3 that results in the desired adjustment. The head 3 is then equipped with an appropriate tool 4, for which purpose a rotation-blocking of the shaft 8 can be accomplished by means of an accessory pin that can be pushed through one of the bores 37 (FIG. 6) that goes through the shaft 8. When the head 3 is moved to the position in alignment with the shaft 2, the hold-down clamps 13 lie against the two tensioning cords 23 of the round belt 22 immediately adjacent to the pulley 11 and are carried along as the swivelling proceeds, whereby the encircling of the pulley 11 is retained because the arrangement of pulley 11 and hold-down clamps 13 does not change position.

As FIG. 4 shows, the two tensioning cords 23 in the resting position of the head 3 are angled at a right-angle position with respect to the part of the round belt 22 that goes around the pulley 11, without the round belt 22 having left the tracking groove 21 (see FIG. 1).

The instrument can now be inserted through an inspection hole that has been provided for the purpose of interior inspection. Following the insertion, the slider 24 is moved against the rear limit stop 28 by again turning the knurled nut 30, this time in the opposite direction, with the result that the head 3, pulled by the actuating rods 31, is swivelled out of its resting position. The movement path of the slider 24 is dimensioned in such a way that when the slider 24 comes to rest against limit stop 28, the head 3 has completed a swivelling movement through 90°. At the same time, the hold-down clamps 13 have lifted from the tensioning cords 23 just before completion of the 90° swivelling movement so that from then on, the round belt 22 can run freely. This is also the position in which the motor 16 can be activated, since the slider 24, through its contact with the inductive proximity switch that forms the limit stop 28, has closed the circuit. At that point, the motor 16 can be switched on, which can be done by means of a foot- or hand-operated switch, for example. The working that is to be done can take place by means of back and forth movement or by swinging movement of the instrument around its shaft 2, while observation of the working site can be carried out in the usual way through the technoscope.

Figure 8:
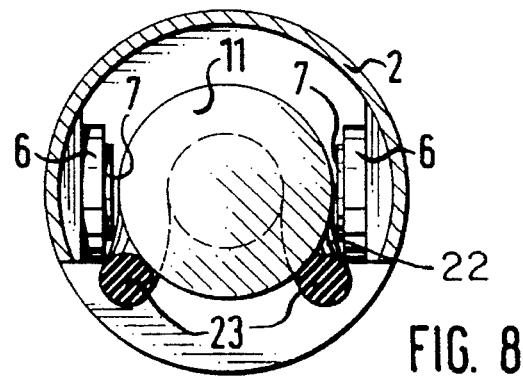
FIG. 8 is a sectional representation corresponding to FIG. 7, showing another embodiment of the instrument according to the invention.

As is shown in FIG. 8, the hold-down clamps 13 can be dispensed with if the fork legs 6 are placed next to the pulley 11 with such tight clearance that when the head is moved from its swivelled position into the insertion position, the legs move against the belt 22 and the tension cords 23 and thus prevent the belt from coming off the pulley.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An instrument for working of surfaces of parts inside engineered cavities by means of a tool while simultaneously viewing a site of the working operation by means of an optic, comprising a rigid shaft (2) having a longitudinal axis and proximal and distal ends that accommodates an optic (5), a head (3) coupled distally to the shaft (2), the head carrying a tool (4) for working a surface and being able to swivel relative to the longitudinal axis of the shaft, the head (3) being linked with the shaft (2) by means of a swivel bearing (15) and being movable between a rest position in alignment with shaft (2) and an operating position angled at an angle of 90° thereto, whereby swivelling of the head (3) is accomplished by actuation means that extend through the shaft (2) and attach to the head (3) eccentric to the swivel bearing (15), the actuation means comprise at least one actuating rod (31) linked at its proximal end to a slider (24) which is guided through a housing (1) having adjustable limit stops (27, 28) at front and rear ends thereof, said slider (24) being reciprocable between said limit stops (27, 28) in a direction parallel to the longitudinal axis of the shaft (2) by means of an adjusting spindle (29), whereby a front limit stop (27) determines the resting position and the rear limit stop (28) determines the operating position of the head (3), and a drive mechanism (16) with power transmission means for rotatably driving the tool (4), said power transmission means extending through the shaft (2), and comprising a belt (22) which goes around a first pulley (20) mounted on a shaft (17) of the drive mechanism (16) and around a second pulley (11) mounted at the head (3) and swivelable with the head, said second pulley (11) and the tool (4) being mounted on a common rotation axis so that when the head (3) is in a position which is swivelled at an angle of 90° to the longitudinal axis of the shaft, both pulleys (11, 20) lie in a common plane, and means (6, 13) for preventing jumping of the belt (22) from the second pulley (11) when the head (3) is in other positions.

2. An instrument according to claim 1, wherein the drive mechanism for the tool (4) through the belt (22) comprises an electric motor (16) which is adjustably and fixably mounted on a housing (1), whereby the motor is adjustable in a direction parallel to the longitudinal axis of the shaft (2) in order to tension the belt (22).

3. An instrument according to claim 1, wherein the rear limit stop (28) is formed as a switch that allows activation of the drive mechanism (16) when the slider (24) touches the switch.

4. An instrument according to claim 1, wherein the optic (5) provided for viewing the site of working extends through a separate channel (33) in the shaft (2), said channel (33) terminating at the distal end before the swivel bearing (15) of the head (3), and said distal end having a side window (35) that serves as an outlet for a free field of view for said optic.

5. An instrument according to claim 4, further comprising illumination means for which said window (35) serves as an outlet.

6. An instrument according to claim 4, wherein said optic (5) is provided on a rigid technoscope.

7. An instrument according to claim 4, wherein said optic is provided on a technoscope with a controlled-bending flexible tip (36) which may bend out of shaft (2) through said window (35).

8. An instrument for working of surfaces of parts inside engineered cavities by means of a tool while simultaneously viewing a site of the working operation by means of an optic, comprising a rigid shaft (2) having a longitudinal axis and proximal and distal ends that accommodates an optic (5), a head (3) coupled distally to the shaft (2), the head carrying a tool (4) for working a surface and being able to swivel relative to the longitudinal axis of the shaft, and a drive mechanism (16) with power transmission means for rotatably driving the tool (4), said power transmission means extending through the shaft (2), and comprising a belt (22) which goes around a first pulley (20) mounted on a shaft (17) of the drive mechanism (16) and around a second pulley (11) mounted at the head (3) and swivelable with the head, said second pulley (11) and the tool (4) being mounted on a common rotation axis so that when the head (3) is in a position which is swivelled at an angle of 90° to the longitudinal axis of the shaft, both pulleys (11, 20) lie in a common plane, and means (6, 13) for preventing jumping of the belt (22) from the second pulley (11) when the head (3) is in other positions, wherein the head (3) is shaped like a fork (6) at its proximal end, each leg of the fork (6) accommodates a bearing pin (7) whose axes align with each other and form a swivelling axis of a swivel bearing (15), and the head (3) accommodates a bearing-mounted shaft (8) whose axis coincides with a longitudinal axis of the head (3), and where the shaft (8) has at its distal end means (10) for accommodating the tool (4), and carries at its proximal end the second pulley (11), whereby said second pulley lies between the fork legs (6) on the head (3) and has a tracking groove (12) for the belt (22) in a plane of the swivelling axis of the swivel bearing (15).

9. An instrument according to claim 8, wherein the means for preventing jumping of the belt (22) are located at the proximal end area of each of the legs of the fork (6) on the head (3), and comprise hold-down clamps (13) that extend transversely to tensioning cords (23) of the belt (22) that goes around the second pulley (11), each hold-down clamp (13) extending over one tensioning cord (23).

10. An instrument according to claim 8, wherein the legs of the fork (6) comprise the means for preventing the belt (22) from jumping from the second pulley (11).

\* \* \* \* \*